Jan. 4, 1949.  T. B. EPPS  2,457,812
STORAGE AND DISPLAY BOX
Filed June 14, 1945  5 Sheets-Sheet 1
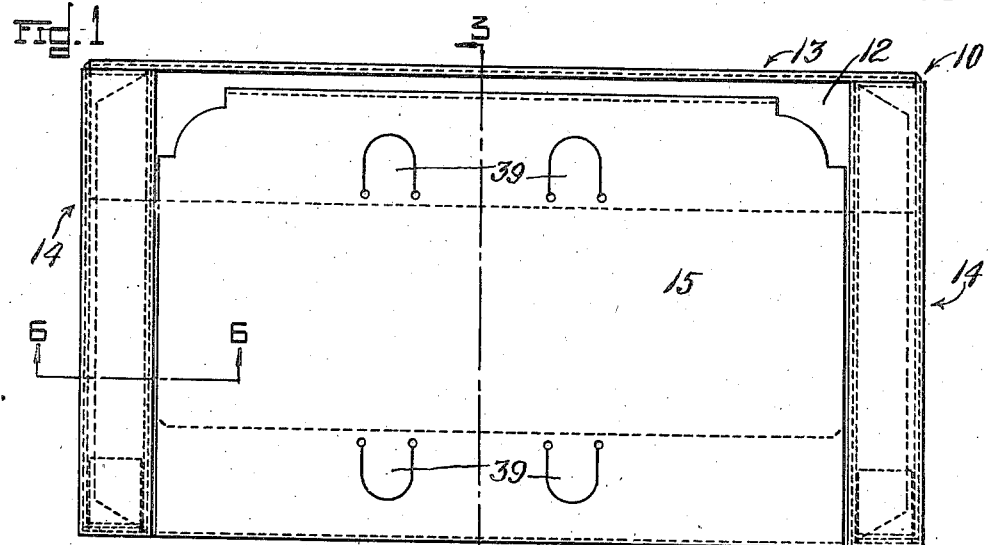
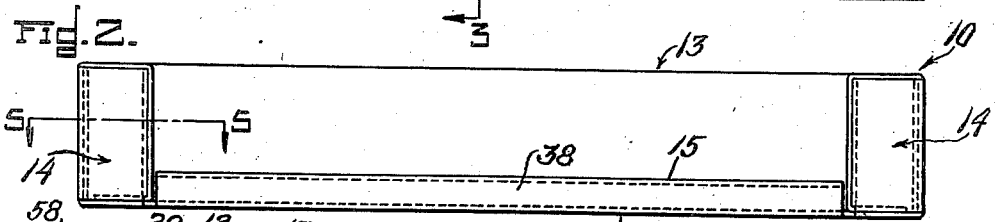
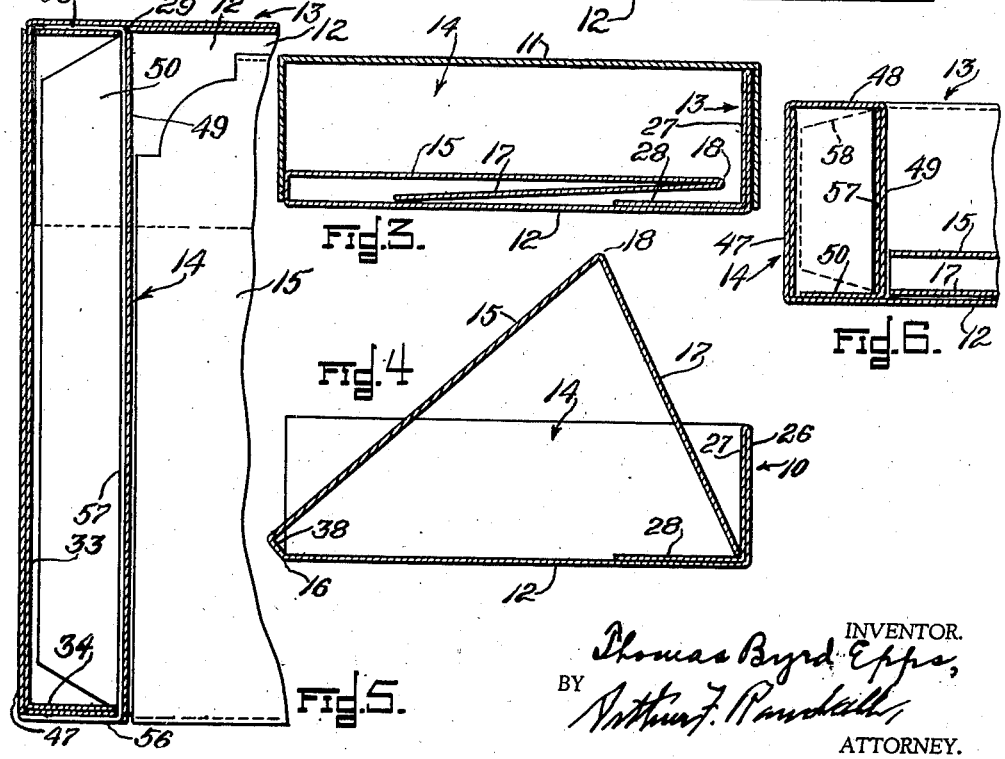
INVENTOR.
Thomas Byrd Epps,
BY Arthur F. Randall
ATTORNEY.

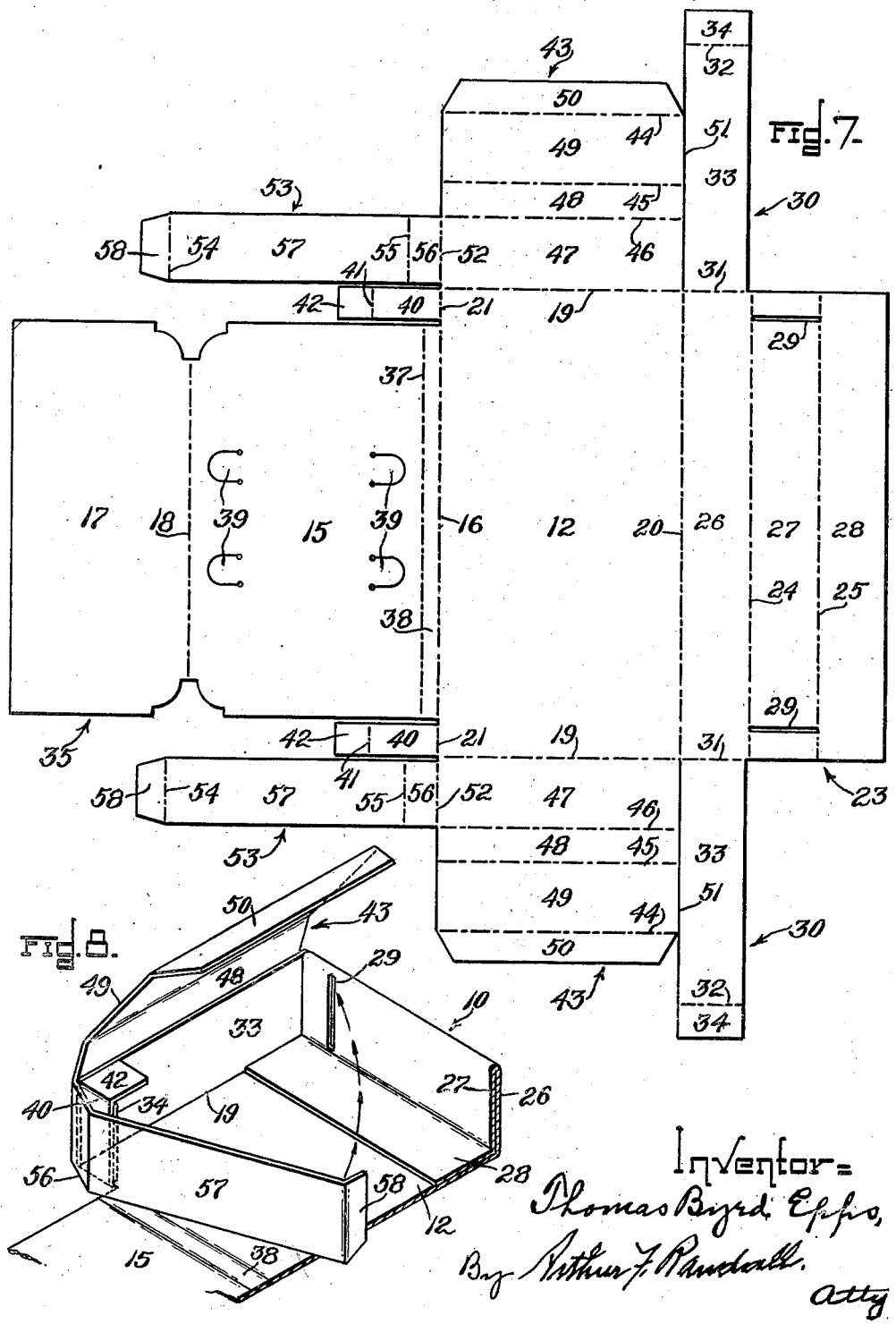

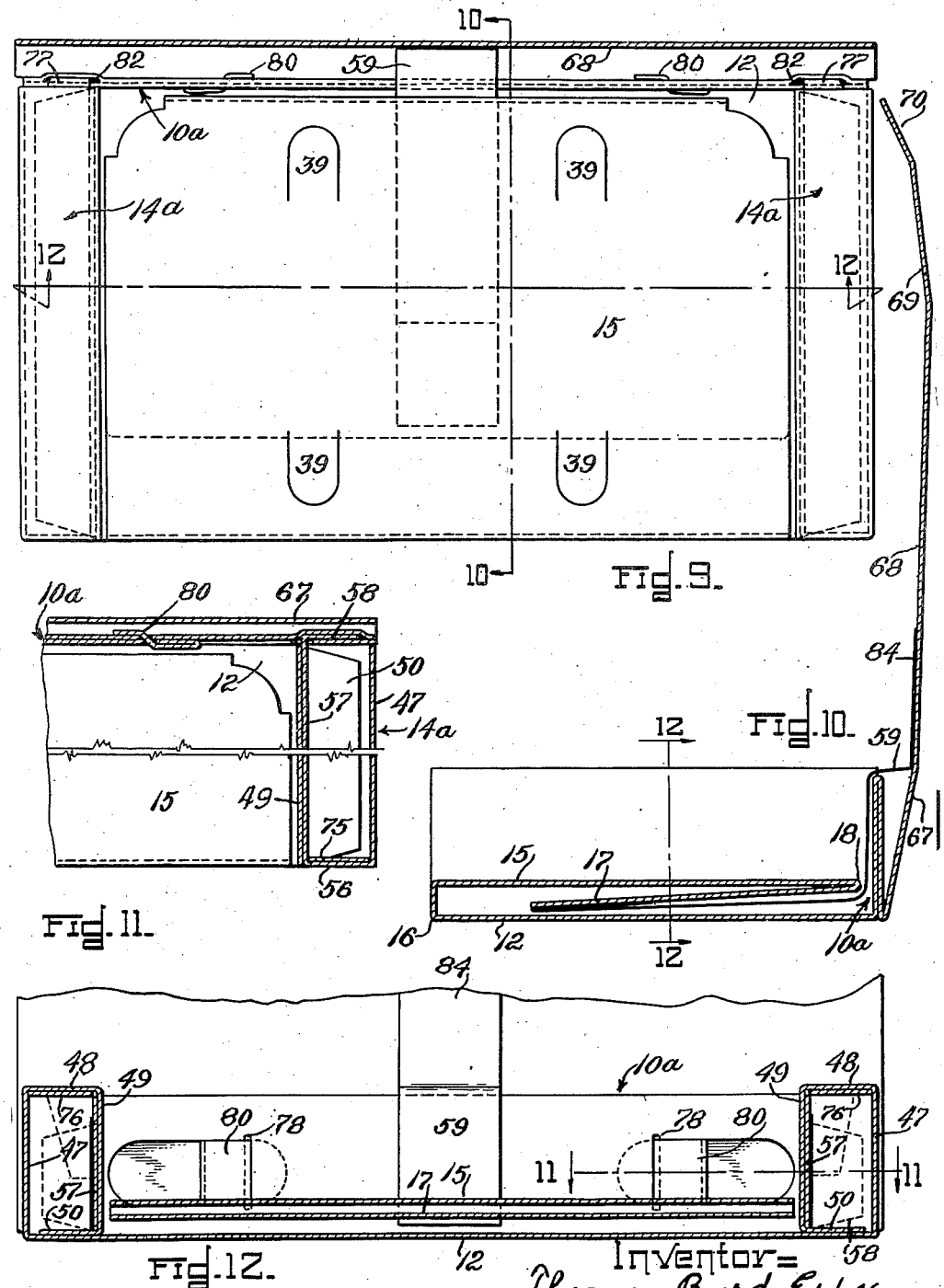

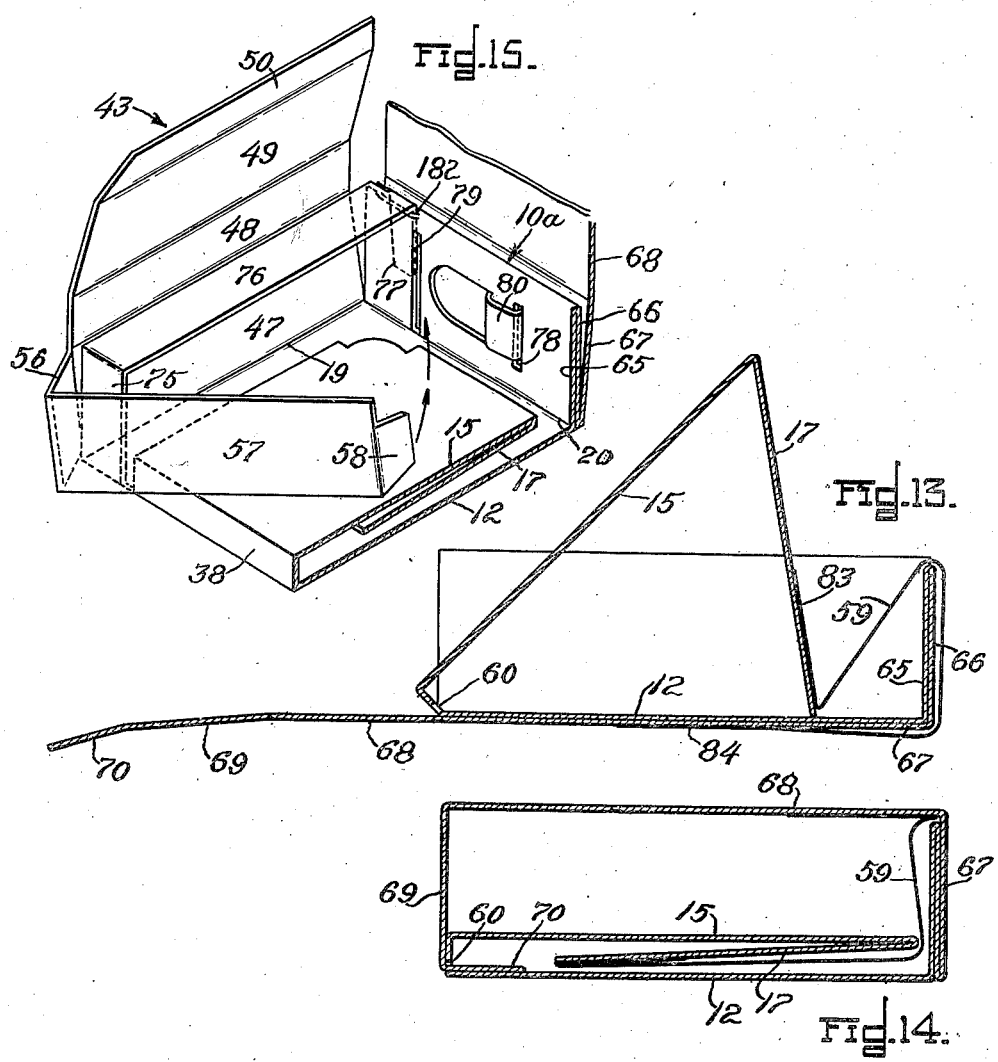

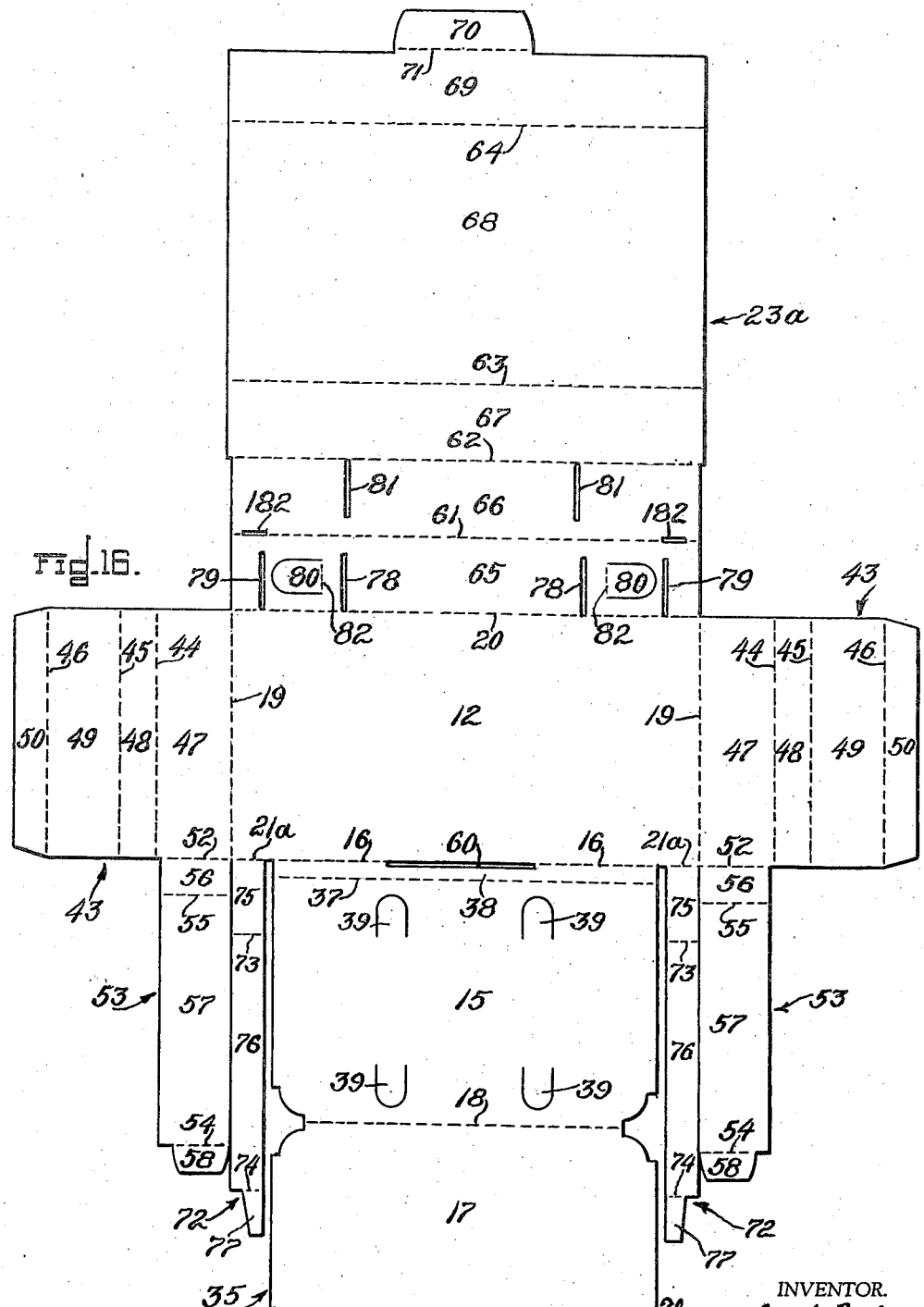

Patented Jan. 4, 1949

2,457,812

UNITED STATES PATENT OFFICE 2,457,812

STORAGE AND DISPLAY BOX

Thomas Byrd Epps, Boston, Mass.

Application June 14, 1945, Serial No. 599,394

3 Claims. (Cl. 206—45.13)

This invention relates to storage and display boxes such as are made from cardboard and other sheet material and it has for its object to provide a box of the class described which will be of attractive and interesting appearance and construction and which will hold and display to good advantage merchandise or other articles.

It is also the object of the invention to provide a storage and display box of strong, rigid and durable construction which can be adjusted to inclose and protect its contents or to support the same in an elevated position where it is fully exposed to view and attractively displayed.

A further object of the invention is to provide a box of the class described which can be produced from a single blank of cardboard or other suitable sheet material and whose parts will mutually support and reinforce each other.

To these ends I have provided certain improvements in storage and display boxes as set forth in the following description, the several novel features of the invention being particularly pointed out and defined in the claims at the close of the description.

In the accompanying drawings:

Figure 1 is a top plan view, partly in section, of the body of a storage and display box embodying one form of my invention.

Figure 2 is a front elevation of the box body shown in Fig. 1.

Figure 3 is a section on line 3—3 of Fig. 1 with the addition of a cover which is shown as applied to the body.

Figure 4 is a section similar to Fig. 3 but with the cover removed and with the article-holding panel, hereinafter described, in its elevated position.

Figure 5 is a section on line 5—5 of Fig. 2.

Figure 6 is a section on line 6—6 of Fig. 1.

Figure 7 shows the one-piece blank of sheet material which is convertible into the box body shown in Figs. 1 and 2.

Figure 8 is a perspective view showing a portion of the box body of Figs. 1 and 2 in partially constructed condition.

Figure 9 is a top plan view, partly in section, of a storage and display box embodying a second form of the invention.

Figure 10 is a section on line 10—10 of Fig. 9.

Figure 11 is a section, partly broken away, taken on the line 11—11 of Fig. 12.

Figure 12 is a section on line 12—12 of Figs. 9 and 10.

Figure 13 is a section like Fig. 10 but showing the cover, hereinafter described, in its fully opened position and the easel, also described later, in its elevated position.

Figure 14 is a section like Fig. 10 but showing the cover in its closed position.

Figure 15 is a perspective view showing a portion of the box of Fig. 9 in partly constructed condition.

Figure 16 shows the one-piece blank of sheet material which is convertible into the body of the box shown in Figs. 9 to 14, inclusive.

The body 10 of the box illustrated in Figs. 1 to 8, inclusive, is produced from a single blank of sheet material like that shown in Fig. 7 and to this body may be telescopically fitted, if desired, a removable cover 11 (Fig. 3) of ordinary construction.

The body 10 comprises a rectangular horizontal bottom wall panel 12; a relatively perpendicular back wall 13; two oppositely disposed spaced apart perpendicular box-like side walls 14, 14 which serve as buttresses for the back wall 13 with which they are connected thereby giving sturdiness and solidity to the structure, and which provide substantially rigid reinforced side walls that are not readily distorted or collapsed under ordinary handling.

Between the side walls 14 there is provided an easel comprising a panel 15 that is hingedly connected at 16 (Fig. 4) with the front of the bottom wall panel 12 and a prop panel 17 which is hingedly connected as at 18 to the rear end of panel 15. This easel 15—17 is provided as a support for the merchandise or article (not shown) that is to be stored or displayed, said merchandise or article being fastened in position upon the top side of panel 15 by means of ribbons or string (not shown) that are engaged with tangs 39 formed in said panel 15 by slitting the same as shown in Fig. 1. Or any other suitable fastening means may be employed.

While the goods or merchandise is not on display the easel 15—17 may be folded up and repose within the box as shown in Fig. 3, but when the goods or merchandise is to be displayed the cover 11 is removed and the easel is adjusted into its elevated position shown in Fig. 4 with the free end of prop 17 resting within the corner at the rear of the body, the panel 15 then being held in its elevated rearwardly inclined position where the goods or merchandise is completely exposed to view from the front owing to the absence of a front wall which would, if present, partly hide the same, but in any event distract the attention and seriously detract from the appearance of the assemblage.

As shown in Fig. 7 the bottom panel 12 is bordered at its opposite sides by bending creases 19, 19; at its rear by a bending crease 20, and at its front by three alined bending creases 21, 16 and 21, the crease 16 serving as the hinge 16 of Fig. 4.

Joining the panel 12 at the crease 20 is a flap 23 (Fig. 7) which is scored to provide two bending creases 24 and 25 which divide flap 23 into three relatively parallel rear wall panels 26, 27 and 28 which are of the same length as bottom panel 12, the intermediate panel 27 being formed near its opposite extremities with slots 29 (Figs. 7 and 8) disposed perpendicularly relatively to the creases 24 and 25. At its opposite extremities the panel 26 is provided with side wall flap extensions 30, 30 each of which is formed with transverse bending creases 31 and 32 which divide said extension into a side wall panel 33 and a small end flap or tang 34, the distance between creases 31 and 32 being approximately the same as the length of the proximate crease 19 and the latter and crease 31 being in alinement.

Joining the bottom wall panel 12 at the hinge crease 16 is an easel flap 35 which is formed with two spaced apart transverse bending creases 18 and 37, the crease 18 serving as the hinge 18 of Figs. 3 and 4 and the two creases 18 and 37 providing the panels 15 and 17 which, together with a narrow panel 38, constitute the easel above referred to.

At opposite sides of the easel flap 35 two small side wall flaps 40, 40 are provided which join the panel 12 at the creases 21 and which are themselves creased transversely near their extremities as at 41 to provide each with an end tang 42.

Joining the bottom wall panel 12 at the creases 19, 19 are two side wall flaps 43, 43, each of which is divided by relatively parallel bending creases 44, 45 and 46 into three side wall panels 47, 48 and 49 and tang 50. These two flaps 43 are separated from the proximate flap extension 33 by a slit 51. Each side wall panel 47 is defined by slit 51, creases 19 and 46 and a third bending crease 52 that is alined with the proximate crease 21. Joining each panel 47 at the adjacent bending crease 52 is a side wall flap extension 53 which is divided transversely by two bending creases 54 and 55 to provide a relatively small wall panel 56, an intermediate side wall panel 57 and a tang 58 at the free end of panel 57.

In converting the blank of Fig. 7 into the box body of Figs. 1 to 6, inclusive, the rear wall panel 26 is first bent upwardly into a position where it is perpendicular to the bottom wall panel 12 and then, as shown in Fig. 8, the panel 27 is bent downwardly into position against the inner face of panel 26 with the panel 28 disposed at right angles thereto and fitted flatwise against the top face of bottom wall panel 12.

The box-like side walls 14 (Figs. 1 and 2) are each then assembled as follows: After bending the tang 34 (Figs. 7 and 8) into position where it is at right angles to panel 33 the latter is bent on crease 31 forwardly into position where it is in register with crease 19 and its tang 34 is in register with crease 21 and then, as illustrated in Fig. 8, the small side wall panel 40 is bent upwardly against tang 34 with its end tang 42 bent inwardly into a horizontal position. Flap 43 is now bent upwardly on crease 19 which brings its panel 47 against the outer face of panel 33 after which the small front wall panel 56 is bent laterally into position against the front face of the small panel or flap 40. Each panel 57 is now bent rearwardly on crease 55, as indicated by the arrows in Fig. 8, and its tang 58 is shoved into slot 29 so that it is frictionally held between the two rear wall panels 26 and 27. Flap 43 is then bent downwardly on the crease 46 to place the panel 48 in position upon the top edges of panels 33, 56 and 57 after which panel 49 is bent downwardly on crease 45 into position alongside of panel 57 with its end flap 50 tucked under the bottom edge of panel 57 as will be clear from Figs. 5 and 6.

Thus fabricated each side wall 14 is of very substantial construction and serves to buttress the rear wall 13 (Figs. 1 and 5), the component parts thereof being securely interlocked without the use of adhesive. The use of adhesive may also be dispensed with in the back wall structure.

The box illustrated in Figs. 9 to 16, inclusive, comprises a body that is produced from the single blank of sheet material shown in Fig. 16 to which is attached a flexible easel-elevating link member 59 (Figs. 9, 10 and 13).

The body of this box comprises a bottom wall panel 12; a perpendicular back wall 10a (Figs. 9 and 15) and two oppositely disposed spaced apart perpendicular box-like side walls 14a which serve as buttresses for the back wall with which they are connected thereby to give sturdiness and solidity to the structure.

Between the two side walls 14a there is provided an easel like that of Figs. 1 and 7 comprising a panel 15 that is hingedly connected at 16 (Figs. 10 and 16) with the front side of panel 12 and a prop panel 17 which is hingedly connected as at 18 to the rear end of panel 15. This easel 15—17 is provided as a support for holding the merchandise or article (not shown) that is to be displayed and it is produced from a composite flap 35 which is similar to the flap 35 of Fig. 7 with the exception that a slot 60 is provided at its junction with panel 12.

As shown in Fig. 16 the bottom panel 12 is, like the panel 12 of Fig. 7, bordered at its opposite sides by bending creases 19, 19; at its rear by a bending crease 20 and at its front by the bending hinge creases 16 and slot 60.

Joining the panel 12 of Fig. 16 at the crease 20 is a flap 23a which goes to make up the rear wall and cover of the box shown in Figs. 9 and 10. This flap is scored transversely to provide four bending creases 61, 62, 63 and 64 which divide said flap into two rear wall panels 65 and 66 and three cover panels 67, 68 and 69, all five of these panels being of approximately the same length as that of bottom panel 12. At its outer free end the flap 23a is made at its middle with a tang 70 for insertion in the slot 60 when the cover occupies its closed position as shown in Fig. 14, a bending crease 71 being provided at its junction with panel 69.

At opposite sides of the easel flap 35 (Fig. 16) two narrow side wall flaps 72 are provided which join the panel 12 at creases 21a that are alined with the creases 16. Each flap 72 is creased transversely at 73 and 74 to provide two panels 75 and 76 and a tang 77 at the outer end of the latter.

Joining the bottom wall panel 12 at the creases 19, 19 (Fig. 16) are two side wall flaps 43, 43 similar to the flaps 43 of Fig. 7 in that each is divided by relatively parallel bending creases 44, 45 and 46 into three side wall panels 47, 48 and 49 and a tang 50. Joining each panel 47 at a bending crease 52 is a side wall flap extension 53 which is divided transversely by two bending creases 54 and 55 to provide a relatively small wall panel 56, an intermediate side wall panel 57 and a tang 58 at the free end of flap 53.

The panel 65 (Fig. 16) is formed near each end thereof with two spaced apart slots 78 and 79 disposed at right angles to creases 20 and 61 and between these two slots the panel is formed with a U-shaped slit which provides a tang 80. When the two panels 65 and 66 are folded together on crease 61 to form the rear wall 10a (Figs. 9, 10 and 11) the slots 78 are brought into positions opposite relatively parallel slots 81 of panel 66 whereupon each tang 80 is bent inwardly on a bending crease 82 (Fig. 16) and shoved endwise through the proximate pair of slots 78 and 81 as shown in Figs. 11 and 15 thereby locking together the two panels 65 and 66.

After thus making up the rear wall 10a it is bent upwardly into a position where it is at right angles to bottom panel 12 after which each panel 75 (Figs. 15 and 16) is bent upwardly on crease 21a and then panel 76 is bent rearwardly on crease 73 with its tang 77 bent downwardly on crease 74 and shoved into a slot 182 provided at the top of rear wall 10a where it occupies a position between panels 65 and 66 of the latter. There are two slots 182, one near each end of crease 61 as shown in Fig. 16.

Each flap 43 is now bent upwardly on crease 19 (Figs. 15 and 16) which brings its panel 47 against the outside of the bent flap which includes the panels 75—76—77 after which panel 56 is bent into position against panel 75 while panel 57 is bent rearwardly on crease 55 into position against the edges of panels 75 and 76 with its tang 58 shoved into slot 79 where it is frictionally held in position between panels 65 and 66. After bending the panel 48 downwardly into position upon the top of panel 76 the panel 49 is bent downwardly into position alongside of panel 57 with its tang 59 shoved into position between the lower edge of said panel 57 and bottom wall 12 as shown in Fig. 12.

The flexible easel elevating link member 59 (Figs. 9, 10, 13 and 14) is a strip or band of flexible sheet material such as textile fabric whereof one end is cemented at 83 (Fig. 13) to the prop 17 and the opposite end at 84 (Figs. 10 and 12) to the cover panel 68 immediately adjacent to the bending crease 63. The length of the intermediate free portion of link 59 is such that when easel 15—17 occupies its elevated position and panel 68 is fitted against the under side of bottom wall 12 as shown in Fig. 13, said link is taut and serves to retain prop 17 in its easel elevating position as shown. When this is the case the cover can be shifted from its closed position shown in Fig. 14 into the upright position shown in Fig. 10, for mere inspection of the contents of the box, without disturbing the collapsed condition of the easel, the latter being automatically adjusted into its elevated position only when and as the cover is swung on hinge crease 62 from the position shown in Fig. 10 into the position shown in Fig. 13.

In each above described embodiment of the invention I have proivded a box involving a new and advantageous method of displaying the contents thereof. With most boxes heretofore provided for merchandise the object lies flat at the bottom of the box and when displaying the same the merchant has to stand the box at an angle or provide a method for adjusting the article within the box so that the public can see it. On the other hand when the lid of my new box is removed or swung into open position as the case may be, the front of the box is open providing unobstructed vision of the article which is either manually or automatically tilted up and supported at an angle of approximately 45 degrees by the easel thus providing perfect display of the merchandise.

Beside the article of merchandise appropriate advertising may be printed on the panel 15 on which the merchandise is fastened to otherwise attract the customer.

The box-like reinforced side walls 14 and 14a give the box sturdiness and solidity which would not otherwise be possible in cardboard or similar material from which boxes of this kind are usually constructed. The box-like sides besides providing sturdy appearance also prevent the ends of the box from distortion or collapsing.

Where the cover is connected by the flexible link with the easel, movability or motion is added to the display, since when the lid is opened the easel is automatically raised to proper display angle. This motion adds to the customer's interest as the article is displayed.

In either case, whether the cover is attached to the box or not, this type of box provides an attractive take-home or gift box in which the purchaser may display the contents of the box to advantage, and further, he may use the contents of the box more readily when the box is placed upon a table or counter with the contents raised to display position.

What I claim is:

1. A box of the character described made from sheet material and having, in combination, a body comprising a bottom wall in the form of a right-angled paralellogram; a perpendicular rear wall; two spaced-apart box-like side walls at opposite sides of said bottom wall each of which is connected with the proximate side of said bottom wall and also with the proximate end of said rear wall; an adjustable easel disposed between said side walls comprising a panel that is hingedly connected at its one end with the front of said bottom wall and also comprising a single prop panel hingedly connected with said first-mentioned easel panel; an adjustable cover flap hingedly connected at its one end with said rear wall and providing a closure for the top and front of said body when occupying its closed position, and a flexible link connecting said prop panel and cover flap through which the latter acts when opened to adjust the prop panel into a position where it supports said hinged panel of the easel in an elevated position where it is fully exposed to view from the front.

2. A box of the character described made from sheet material and having, in combination, a body comprising a bottom wall in the form of a right-angled parrallelogram; a perpendicular rear wall; two spaced-apart box-like side walls at opposite sides of said bottom wall each of which is connected with the proximate side of said bottom wall and also with the proximate end of said rear wall; an adjustable easel disposed between said side walls comprising a panel that is hingedly connected at its one end with the front of said bottom wall and also comprising a prop panel hingedly connected with the opposite end of said first-mentioned easel panel, and an adjustable cover flap hingedly connected at its one end with said rear wall and providing a closure for the top and front of said body when occupying its closed position, said cover flap being formed with transverse bending creases which divide said flap into three panels including a panel to fit against the outside of said rear wall when the cover is closed and flatwise against the under side of said bottom wall when the cover occupies its fully open position, a top wall panel that incloses said easel from above when the cover is closed while the easel is collapsed within the box and which fits flatwise against the outside of said bottom wall when the cover occupies its fully open position, and a front wall panel which occupies a position in front of the collapsed easel when the cover is fully closed and which may be alined with said top wall panel when the cover occupies its fully open position.

3. A box of the character described made from a single one-piece blank of sheet material that is formed with bending creases defining a bottom wall panel in the form of a right-angled parallelogram; a flap hingedly connected with the front boundary of said bottom wall panel and formed with a transverse bending crease permitting said flap to be converted into an easel provided with a prop panel at the free end of said flap; a flap hingedly connected with the rear boundary of said bottom wall panel and adjustable into perpendicular relationship with said bottom wall panel to provide a rear wall, and two groups of flaps connected with the opposite sides of said bottom wall panel, the flaps of each group being adjustable on bending creases formed therein into interlocked relationship to form a perpendicular box-like wall structure composed of a plurality of panels some of which are connected with the proximate end of said rear wall.

THOMAS BYRD EPPS.

REFERENCES CITED

The following references are of record in the file of this patent:

UNITED STATES PATENTS

| Number | Name | Date |
|---|---|---|
| 1,029,096 | Wolf | June 11, 1912 |
| 1,182,809 | Sonn | May 9, 1916 |
| 1,691,781 | Meyer | Nov. 13, 1928 |
| 2,170,723 | Marx | Aug. 22, 1939 |
| 2,375,843 | Gottlieb | May 15, 1945 |